United States Patent Office

3,337,366
Patented Aug. 22, 1967

3,337,366
RECOVERING SUGARS FROM AQUEOUS PULPING LIQUOR CONTAINING LIGNOSULFONATES USING ACETONE
Gerrit G. De Haas, Longview, Leslie H. Clark, Kelso, and Charles J. Lang, Longview, Wash., assignors to Weyerhaeuser Company, Tacoma, Wash., a corporation of Washington
Filed Feb. 24, 1964, Ser. No. 346,878
10 Claims. (Cl. 127—46)

This invention relates to a process for recovering products from spent pulping liquor. More specifically, this invention relates to a process for recovering desugared lignosulfonate and a fraction containing sugar from spent pulping liquor.

Sulfite spent liquor is obtained as a by-product of sulfite pulp production. This is an aqueous solution containing processed chemicals along with components of the wood which were dissolved during the pulping operation.

The sulfite spent liquor is predominantly water but contains nonvolatile solids in concentrations usually up to about 8–14%. These solids will be about 60% lignosulfonates from sulfonation of lignin and about 20% sugars from holocellulose hydrolysis during the pulping operation. The remaining material consists mostly of spent cooking chemicals, organic acids and decomposition products.

An approach to the utilization of sulfite spent liquor components is the development of methods to recover the components, or their derivatives, in a form which can be sold at a profit. For example, sulfite liquor itself is being used to a limited extent as a road binder. The sugars in spent liquors are being converted by microorganisms to produce industrial alcohol or fodder yeast. In other cases spent liquor concentrates or solids are being sold for use as binders and adhesives, emulsifiers, soil modifiers, surface-active agents, and tanning materials. By treating the lignosulfonate in the liquor with caustic or lime, it can be converted into vanillin, a well-known flavoring and perfume component.

Much effort over many years has been directed toward the development of economical methods for the utilization of the substances present in these spent liquors. One approach has been to evaporate the water to obtain the solids in a concentrated solution so that they then can be burned, preferably with recovery of useful heat and of the process chemicals in the form suitable for reuse.

Another approach to recovering lignosulfonates involves the precipitation of the lignosulfonates with lime. However, this process results in the decomposition of the sugars in the spent sulfite liquors. These sugars are useful and can be recovered. Also, by precipitating the lignosulfonates a liquid solid solution or mixture is produced which involves complicated machinery to handle.

Another approach to the recovery of lignosulfonates involves the drying of the spent liquors solids so a powder containing about 10% or less moisture is produced. The extraction of the powder takes a relatively long time and eventually requires the addition of a mineral acid, preferably sulfuric acid. The extraction and recovery of the acid solids cannot be carried out efficiently if the mixtures of solids and liquids have to be handled instead of liquids only. Accordingly, this process has proved to be unsatisfactory since it is uneconomical and high cost mechanisms are needed to recover the lignosulfonates.

The object of this invention is to provide a process for recovering by-products from spent sulfite liquors.

Another object of this invention is to provide an economical process for recovering lignosulfonates and sugars from the spent sulfite liquors used in pulping operations.

Another object of this invention is to provide superior raw materials for the production of modified lignosulfonates and sugars.

Another object of this invention is to provide a method of producing or recovering desugared lignosulfonates employing a liquid-liquid separation process.

Another object of this invention is to provide a method to produce first desugared lignosulfonates and then separate these desugared lignosulfonates into fractions of higher and lower molecular weight lignosulfonates.

These and other objects and advantages will become manifestly clear to those skilled in the art when taken in conjunction with the detailed description and drawings, wherein.

Figure 2:
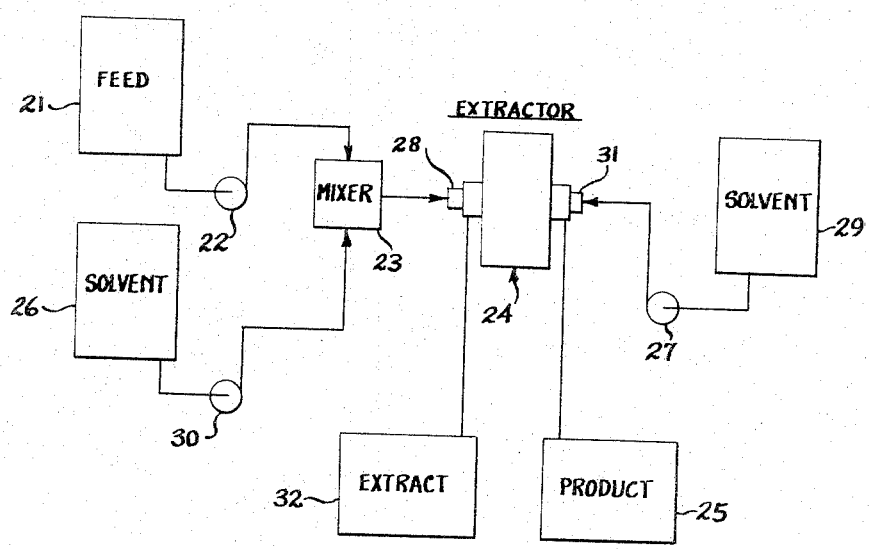
FIGURE 2 is a flow diagram for the continuous production of desugared lignosulfonates from the sulfite spent liquor.

The continuous process of the present invention, see FIGURE 2, is practiced by first placing the sulfite spent liquor in a tank 21 for extraction. The spent sulfite liquor will contain lignosulfonate and sugars as noted above. The spent sulfite liquor may be subjected to an evaporation process to bring the total solids in suspension in the liquor to from 8 to 65%, preferably about 55%. The temperature of the spent sulfite liquor is maintained from 50° F. to 240° F.

A solvent from tank 26 and the spent sulfite liquor from the feed tank 21 are pumped by pumps 30 and 22 respectively through the in-line mixing unit 23. The temperature of the solvent and the temperature of the solvent-spent liquor mixture are generally maintained below 180° F. The ratio of solvent to liquor may be from ½ to 10 parts of solvent to one part of the spent sulfite liquor.

The solvent that is usable in the practice of this invention is a mixture of acetone and lower boiling aliphatic alcohols, such as, methanol, ethanol, isopropanol, and tertiary butyl alcohol. The ratio, for example, may be from 20 to 100% acetone, 0 to 80% methanol, and 0 to 50% water. The preferred solvent is 65% acetone and 35% methanol. However, the ethanol, isopropanol, and tertiary butyl alcohol may be used in combination with acetone or may be used without acetone or in mixtures thereof. But, if methanol is used, it must be combined with acetone, ethanol, isopropanol, or tertiary butyl alcohol.

The mixture of spent sulfite liquor and solvent tends to separate into a heavy phase and a light phase. The separation takes place in the extractor. The heavy phase of the liquor-solvent mixture will contain a high concentration of lignosulfonates and a portion of the solvent.

While the mixture of solvent and spent sulfite liquor is piped from the mixer 23 to a countercurrent extractor 24 on one side as indicated at 28, a different solvent or preferably a solvent mixture is pumped into the other side of the extractor, as indicated at 31, by pump 27 from storage tank 29. FIGURE 2 shows a countercurrent centrifugal type of extractor, for example a Podbielniak extractor. However, it should be pointed out that a countercurrent column extractor can also be satisfactorily used.

It is advantageous that the spent sulfite liquor can be treated with two different solvent mixtures while passing through the system. For example, the solvent from tank 26 may consist primarily of acetone and methanol with little or no water, while the solvent from tank 29 may contain a significant amount of water in addition to acetone nad methanol. Accordingly, the solvent used in the extraction phase may be a mixture of acetone and lower boiling aliphatic alcohols, such as, methanol, ethanol, isopropanol, and tertiary butyl alcohol. The ratio, for example, may be from 20 to 100% acetone, 0 to 80% methanol, and 0 to 50% water. The ethanol, isopropanol, and tertiary butyl alcohol may be used in combination with acetone or may be used without acetone or in mixtures thereof. But, if methanol is used, it must be combined with acetone, ethanol, isopropanol, or tertiary butyl alcohol. The product flowing to tank 25 will contain very little residual sugar. If the concentration of the feed increases to the point of effecting the continuous operation of the centrifugal extractor, then the water content of the solvent from tank 26 is increased. If it is desirable to switch to a different kind of product containnig less lower molecular lignosulfonates, the methanol content of the solvent in tank 29 is increased. The composition of the extract 32 may be changed to a higher sugar total solids ratio by increasing the solvent feed ratio and the acetone-methanol ratio entering at 28. At the same time, the water content of the solvent entering at 31 is decreased.

The product 25 and the extract 32 are continuously piped to stripping columns to separate the products and the extract from the solvent. The solvent fractions are then passed through fractionating columns and finally returned to the continuous countercurrent extractor.

The description of the process given applies to spent sulfite liquor. However, the system can be used to separate, for example, a desugared lignosulfonate product into higher and lower molecular weight fractions. In this case the product is rerun through the same extractor. The solvent from tank 26 will now contain more water and methanol than during the desugaring operation of the spent sulfite liquor. Instead of rerunning the product through the same extractor, a second extractor in series may be used.

The extract may be also subjected to a second treatment for further improvement. However, in many cases, concentrating of the extract prior to the second treatment is advisable. The sugars remaining in the light phase after the solvent has been removed may be used for making molasses.

It should be noted that the flow diagram illustrated by FIGURE 2 is for continuous operation. At times it may be desirable to perform a batch separation ahead of the countercurrent extractor. This involves a separation of the light and heavy liquid phases after the in-line mixer and feeding only the heavy phase to the extractor. In this manner, the residual lignosulfonates in the batch extract will be of relatively lower molecular weight than those found in the subsequent countercurrent extract.

Figure 1:
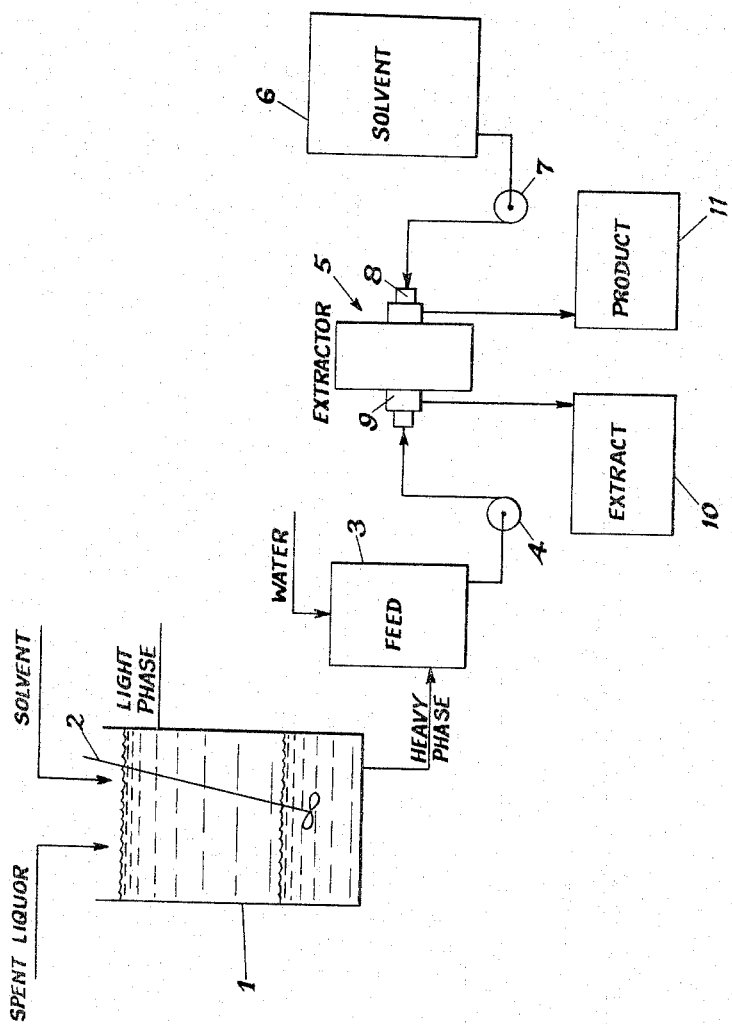
FIGURE 1 is a flow diagram for the batch production of desugared lignosulfonates from the sulfite spent liquor.

In a batch separation process, see FIGURE 1, a solvent is injected into mixing tank 1 at a temperature of from 60° F. to 200° F. The ratio of solvent to liquor may be from ½ to 10 parts of solvent to 1 part of the spent sulfite liquor. The liquor and solvent may be mixed by a stirring mechanism 2 and allowed to settle from 10 min. to 5 hrs. depending upon the conditions that exist.

The solvent that is usable in the practice of this invention is a mixture of acetone and lower boiling aliphatic alcohols, such as, methanol, ethanol, isopropanol, and tertiary butyl alcohol. The ratio, for example, may be from 20 to 100% acetone, 0 to 80% methanol, and 0 to 50% water. The preferred solvent is 65% acetone and 35% methanol. However, the ethanol, isopropanol, and tertiary butyl alcohol may be used in combination with acetone or may be used without acetone or in mixtures thereof. But, if methanol is used, it must be combined with acetone, ethanol, isopropanol, or tertiary butyl alcohol.

After the liquor and solvent have been allowed to settle for the desired length of time, a two-phase liquid system will appear. The upper light phase of the liquor solvent mixture will contain a high concentration of dissolved sugars in addition to the solvent used. The lower heavy phase of the liquor solvent mixture will contain a high concentration of lignosulfonates and a portion of the solvent.

The heavy phase of the liquor solvent mixture is then drained off and placed into a feed tank 3 to be fed into a countercurrent extractor 5. Water may be added to the heavy phase in the feed tank 3 so as to bring the percentage of water at around 50% to reduce the viscosity to improve the operation of the countercurrent extractor. It should be noted that the feed tank 3 may be bypassed if a continuous operation is practiced.

Then the heavy phase in the feed tank 3 is pumped into the countercurrent extractor 5 by pump 4 on one side as indicated at 9. A solvent is pumped into the other side of the extractor as indicated at 8 by pump 7 from storage tank 6. For convenience of illustration, a conventional countercurrent Podbielniak extractor has been shown; however, it should be pointed out that other types of countercurrent extractors can be satisfactorily used.

The solvent used in the extractor phase may be a mixture of acetone and lower boiling aliphatic alcohols, such as, methanol, ethanol, isopropanol, and tertiary butyl alcohol. The ratio, for example, may be from 20 to 100% acetone, 0 to 80% methanol, and 0 to 50% water. The ethanol, isopropanol, and tertiary butyl alcohol may be used in combination with acetone or may be used without acetone or in mixtures thereof. But, if methanol is used it must be combined with acetone, ethanol, isopropanol, or tertiary butyl alcohol.

The extractor 5 will produce extract 10 which will contain the additional sugars and a portion of the solvent. The other portion 11 will be substantially sugar free lignosulfonate along with some of the solvent. The lignosulfonates may then be separated from the solvent in a stripping column to produce the product.

After the heavy phase containing the lignosulfonates has been removed from the mixing tank 1, the upper light phase having the sugars dissolved therein is passed through a stripping column for solvent removal.

The following examples are given to further illustrate the invention.

EXAMPLE 1

Spent sulfite liquor was first concentrated to contain about 50% solids in solution. The concentrated spent liquor was pumped into a mixer settler tank along with an acetone-methanol solvent on a volume basis of 2 parts solvent to 1 part spent liquor. The acetone-methanol solvent was 65% acetone, 35% methanol. A total time of two hours was allowed for filling, mixing, settling and emptying in this initial stage. The bottom (heavy) layer and the top (light) layer were separated upon settling and each was pumped to their respective tanks. The temperature in the initial mixing tank was 100° F.

Water was added to the bottom heavy layer in the feed tank to bring the mixture up to contain 50% water (volume basis). This heavy bottom layer liquid phase at 150° F. was then fed into a liquid-liquid countercurrent Podbielniak extractor on one side thereof. To the other side of the Podbielniak extractor was fed a solvent containing 58% acetone, 31% methanol and 11% water. The resulting product was essentially sugar free lignosulfonate which was then sent to a storage tank prior to solvent removal and drying. The extract from extractor contained essentially all the sugars along with some solvent. This extract was pumped into the light phase extract tank.

The contents of the light phase extract tank containing the light phase was fed to a stripping tower where the solvent was stripped from the sugar. The solvent vapors were concentrated and sent back for reuse. The bottoms from this stripping tower served as the raw material for the production of molasses.

The use of acetone or a mixture of acetone and methanol with or without additional water has several advantages within the present invention. These advantages include the fact that acetone and methanol are produced during the pulping operation and can be recovered as by-products from the digester relief and blow gases. Accordingly, a cheap source of acetone and methanol is inherently present in the pulping operation. Also, acetone and methanol have relatively low boiling points and they do not form azeotropic mixtures with water that are difficult to separate. Consequently, the recovery of these solvents for reuse in the extraction process presents a minimum of difficulties. Moreover, the use of acetone and methanol in the extraction process have excellent solubility properties for the sugars in the spent sulfite liquor in addition to producing a relatively high yield of desugared lignosulfonates.

While specific details of a preferred embodiment have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. A process for recovering by-products from a spent, aqueous pulping liquor containing sugars and lignosulfonates, comprising the steps of: mixing a first solvent capable of forming a two-phase liquid-liquid system with said aqueous pulping liquor; said first solvent consisting of from 40 to 100% by volume acetone, from 0 to 60% by volume methanol, and from 0 to 25% by volume water; the sugars in said pulping liquor being dissolved in the light organic phase of said two-phase liquid-liquid system and the lignosulfonates being dissolved in the heavy aqueous phase of said two-phase liquid-liquid system; feeding the first solvent-liquor mixture into a liquid-liquid extractor; feeding a second solvent into said extractor simultaneously with and countercurrently to said mixture; said second solvent consisting essentially of from 40 to 100% by volume acetone, from 0 to 60% by volume methanol, and from 0 to 25% by volume water, recovering sugar within said light organic phase and lignosulfonates with said heavy aqueous phase from said xetractor.

2. A process as set forth in claim 1 wherein said second solvent is provided with more water than said first solvent.

3. The process as set forth in claim 1 wherein the amount of first solvent used to form the two-phase liquid-liquid system is at a ratio of from ½ to 10 parts of solvent to 1 part of spent pulping liquor.

4. The process as set forth in claim 1 wherein said first solvent consists of 65% acetone and 35% methanol.

5. The process as set forth in claim 1 wherein said second solvent consists of 58% acetone, 31% methanol and 11% water.

6. A process for recovering by-products from a spent, aqueous pulping liquor containing sugars and lignosulfonates, comprising the steps of: mixing a first solvent capable of forming a two-phase liquid-liquid system with said aqueous pulping liquor; said first solvent consisting of from 40 to 100% by volume acetone, from 0 to 60% by volume methanol, and from 0 to 25% by volume water; allowing the pulping liquor and the first solvent to settle a sufficient length of time to form an upper light phase and lower heavy phase liquid-liquid system; said sugars in said pulping liquor being dissolved in the upper light organic phase of said two-phase liquid-liquid system and the lignosulfonates being dissolved in the heavy aqueous phase of said two-phase liquid-liquid system; separating the upper light phase from the lower heavy phase; recovering sugars from the upper light phase; feeding the lower heavy phase into a countercurrent liquid-liquid extractor along with a second solvent consisting essentially of from 0 to 100% by volume acetone, from 0 to 60% by volume methanol, and from 0 to 25% by volume water; recovering lignosulfonates from said extractor.

7. The process as set forth in claim 6 wherein more water is present within the second solvent than in said first solvent.

8. The process as set forth in claim 6 wherein the ratio of the first solvent with the pulping liquor is from ½ to 10 parts of the first solvent to 1 part of said pulping liquor.

9. The process as set forth in claim 6 wherein said first solvent is 65% acetone and 35% methanol.

10. The process as set forth in claim 6 wherein said second solvent is 58% acetone, 31% methanol and 11% water.

References Cited

UNITED STATES PATENTS

| | | | |
|---|---|---|---|
| 1,964,646 | 6/1934 | Oxley | 127—37 |
| 2,423,020 | 6/1947 | Haun | 162—14 X |
| 2,431,163 | 11/1947 | Boehm | 127—37 X |
| 2,526,607 | 10/1950 | Kurth | 127—37 X |
| 2,944,922 | 7/1960 | Boggs | 127—37 |
| 2,951,775 | 9/1960 | Apel | 127—37 |
| 2,959,500 | 11/1960 | Schlapfer | 127—37 |
| 3,212,933 | 10/1965 | Hess | 127—37 |

FOREIGN PATENTS 250,739  9/1960  Australia.

NORMAN YUDKOFF, *Primary Examiner.*

S. J. EMERY, *Assistant Examiner.*